United States Patent [19]

Winterbottom et al.

[11] Patent Number: 4,672,550
[45] Date of Patent: Jun. 9, 1987

[54] COMPUTER CONTROLLED MACHINE TOOL

[75] Inventors: Robert J. H. Winterbottom, Coventry; Walter G. Edwards, Rugby, both of England

[73] Assignee: AE PLC, England

[21] Appl. No.: 597,544

[22] Filed: Apr. 6, 1984

[30] Foreign Application Priority Data

Jul. 23, 1983 [GB] United Kingdom ................ 8319892

[51] Int. Cl.⁴ ........................ G06F 15/46; G05B 19/31
[52] U.S. Cl. .................................. 364/474; 364/180; 318/590; 318/604
[58] Field of Search ............... 364/160, 163, 167, 180, 364/474, 475; 318/569, 590, 604

[56] References Cited

U.S. PATENT DOCUMENTS

| | | | |
|---|---|---|---|
| 3,845,284 | 10/1974 | Taguchi et al. | 318/604 |
| 3,939,390 | 2/1976 | Pomella et al. | 318/604 |
| 3,984,665 | 10/1976 | Shriver et al. | 364/163 |
| 4,245,298 | 1/1981 | Slater | 318/604 |
| 4,341,986 | 7/1982 | Browder | 318/604 |
| 4,375,670 | 3/1983 | Kralowetz et al. | 364/474 |
| 4,446,408 | 5/1984 | Ebermann et al. | 318/604 |
| 4,495,588 | 1/1985 | Nio et al. | 364/192 |

Primary Examiner—Jerry Smith
Assistant Examiner—John R. Lastova
Attorney, Agent, or Firm—Leydig, Voit & Mayer

[57] ABSTRACT

A control system is provided for allowing complex shapes to be machined on a workpiece at high speed. The control system is computer controlled and receives workpiece profile data which are converted into a succession of tool position signals during machining. Not all the digital signals are calculated at one time, a number of future digital signals are calculated during a succession of time intervals. In each time interval, a tool position signal is outputted which is of a constant amplitude corresponding to the required tool position and which is fed to a signal processor where it is converted into a continuous signal which so changes progressively that at successive time intervals, equal to the time intervals of the tool position signals, the amplitude of the continuous signal is related to the successive values of the tool position signals. This continuous signal is fed to a closed-loop control system which controls the movement of the tool holder in accordance with the continuous signal. The tool holder is of a type having a bandwidth sufficient to allow the required movements at the required speed. The control system has proportional and differential feedback.

3 Claims, 2 Drawing Figures

COMPUTER CONTROLLED MACHINE TOOL

BACKGROUND TO THE INVENTION

1. Field of the Invention

The invention relates to the control of the machining of workpieces by a machine tool in which the tool and the workpiece rotate relatively to one another to produce a shaped profile on the workpiece.

2. Review of the Prior Art

In recent years, the computer control of machine tools has been widely developed. The computer produces a succession of digital signals which are used to position the tool to provide a required profile on the workpiece. In general, the computer calculates the required digital signals in advance and feeds them to a store where they are held and fed at required times to a conventional tool moving system which comprises a tool slide moved by a motor through a feed screw. It is not always necessary for there to be any tool position feedback and so the motor can be a stepping motor which is controlled by counting down a register containing a signal corresponding to the required number of steps of the motor to produce the required tool position.

Because of the comparatively low speed of relative rotation between the tool and the workpiece, and because of the absence of any tool feedback, the production of the digital signals can be readily handled by a computer of modest size. In addition, the inertia of the slide is sufficient to smooth out the stepped nature of the signal applied to the motor.

If, however, the relative speed of rotation of the tool and the workpiece is increased dramatically, and if the tool is required to alter its position within a revolution, an entirely different situation prevails. First, it is necessary to have a tool capable of being moved very rapidly indeed; that is a tool holder having a low inertia. Tool position feedback is necessary to ensure that the position of the tool alters accurately within each revolution. At these speeds, computers conventionally used will produce digital tool control signals at a rate which is insufficiently frequent to permit the tool holder to move in accordance with such signals; the tool holder would be required to have infinite acceleration between successive signals and this is plainly not possible. The computer thus does not have the capacity to produce signals at a frequency sufficient to allow the tool holder to make the required movements.

This lack of capacity of conventional computers produces the further problem that the computer is incapable of performing the required feedback control while maintaining the required high rotational speeds. Indeed, if the computer is required to produce digital tool control signals at a substantial number of positions within a revolution (as may be necessary to define many required profiles), the computer will generally be incapable of storing all the required digital signals for the machining operation.

In general, therefore, it has not heretofore been possible to machine complex profiles on a workpiece by computer numerical control at the rates required for commercial production.

Such machining has in general been performed by cam follower machines in which a shaped cam is contacted by a cam follower whose motion is transmitted to the tool. The production of the shaped cams is, however, both time consuming and expensive and the use of cams makes the process inflexible. In addition, the speed at which a cam follower can follow a cam is limited, since at high rotational speeds the follower may lift-off the cam so introducing inaccuracies into the workpiece.

SUMMARY OF THE INVENTION

According to a first aspect of the invention, there is provided a control system for a machine tool in which a tool holder and a workpiece rotate relatively to one another during machining, the control system comprising: a computer for producing from input data fed thereto, a succession of digital signals defining required successive tool holder positions to machine a workpiece to a predetermined profile, a signal processor for converting said digital signals into a corresponding continuous signal, and a closed-loop continuous control system for receiving the continuous signal and for controlling the movement of the tool holder in accordance therewith.

The difficulties are thus avoided by converting the digitally produced succession of constant amplitude tool holder position signals into a corresponding continuous signal and feeding this signal to a closed-loop continuous control system so that the feedback control is not performed by the computer. In this way, the computer can be used simply to calculate required tool holder position signals and output them at required time intervals. This allows a microprocessor to be used to control the machining while allowing the machining to take place at high speed and with complex non-circular profiles. The tool is actuated by a continuous signal and so is not required to move with infinite acceleration.

According to a second aspect of the invention, there is provided a method of machining a workpiece using a tool holder, with the workpiece and the tool holder rotating relatively to one another, the method comprising: feeding to a computer data defining a required profile of the workpiece, producing from the computer a succession of digital signals defining a succession of required tool holder positions to machine the workpiece to said profile, processing said succession of digital signals to produce a corresponding continuous signal, feeding said continuous signal to a closed-loop control system, and controlling the movement of the tool holder with said closed-loop control system.

BRIEF DESCRIPTION OF THE DRAWINGS

The following is a more detailed description of two embodiments of the invention, by way of example, reference being made to the accompanying drawings in which.

DESCRIPTION OF THE PREFERRED EMBODIMENTS

Figure 1:
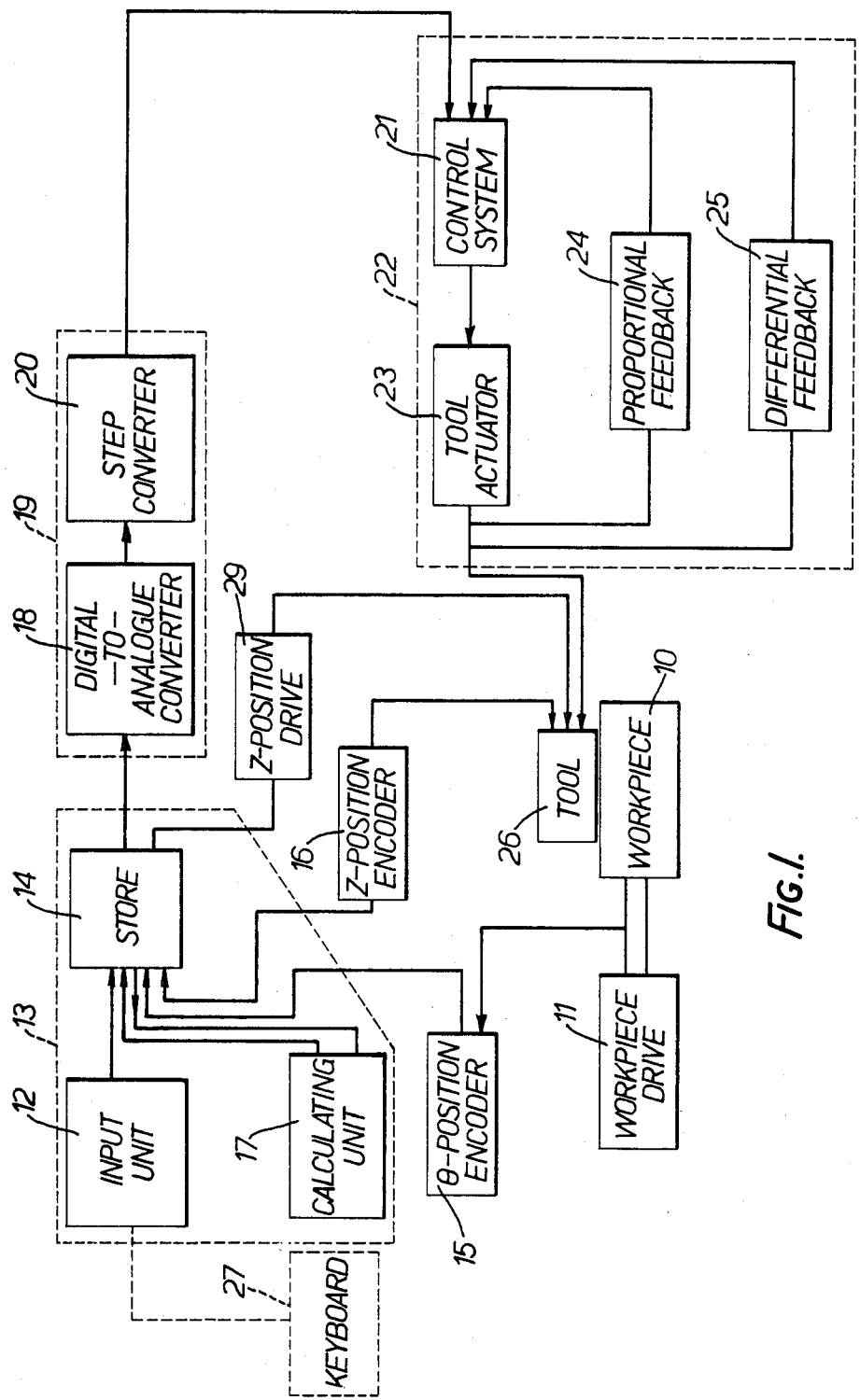
FIG. 1 is a schematic block diagram of a first control system for use in the high-speed machining of a workpiece to have a non-circular profile.

Referring first to FIG. 1, the workpiece 10 is rotated at high speed by a workpiece drive 11. The speed of revolution of the workpiece may be of the order of 50 revolutions per second (3000 rpm).

The workpiece 10 may be a generally cylindrical blank such as an aluminum or aluminum alloy piston blank. the workpiece is to be machined to have a non-cylindrical profile which, for example, may be an oval or elliptical cross-section of varying axial dimensions along the axial length of the workpiece to produce a barrelling effect. Additionally or alternatively, it may be required to form the blank with a plurality of raised surface portions. It will be appreciated that the degree of ovality or barrell or the height of the raised surface areas above the remainder of the piston may be very small indeed; of the order of only a few or tens of microns.

Alternatively, the workpiece may be a blank (not shown) for forming a bearing surface. This may be a cylindrical blank whose interior or exterior surface is to be machined to a required non-cylindrical profile, or a generally flat surface lying in a plane generally normal to its axis of rotation and to be machined to a required non-flat profile to form a thrust bearing.

The workpiece 10 is machined by a tool 26 which is described in more detail below and which is movable radially towards and away from the workpiece 10 (R-position) by a closed-loop control system 22, also described in more detail below. In addition, a Z-position actuator 28 is provided for moving the tool 26 in a direction (the Z-direction) parallel to the axis of rotation of the workpiece 10. This Z-position actuator 28 can either be controlled by signals produced by the control system or the actuator 28 can be set to traverse the tool 26 along the workpiece 10 at a set rate.

Prior to machining, input profile data is prepared which defines the required profile of the workpiece at a succession of angular positions around the workpiece and at a succession of axial positions along the workpiece. Angularly (in a $\theta$-direction) the profile may be defined at intervals around the workpiece 10 as drops or decreases from a nominal maximum radius. These intervals may, for example, be 2.5 degrees for a piston or 0.5 degrees for a bearing. The maximum drop may be 1–5 m in steps 0.125 microns. These angular positions may be defined at a succession of axial (Z) positions which are spaced apart by 10 mm along the axis of the workpiece 10.

Where the workpiece is symmetrical about one or more planes including the axis of rotation of the workpiece, it is only necessary to define the input data for the initial symmetrical portion. For example, where the cross-section is to be elliptical, only input data for a 90 degree segment of the ellipse between the two planes of symmetry need be defined. In addition, the cross-sectional profile need only be defined at those axial intervals where there is a non-linear change in the profile or the rate of change of the profile.

The profile data is fed to an input device 12 of a computer 13 and passes from the input device to a store 14 of the computer 13. The computer 13 may be a micro-processor.

The workpiece is set in rotation and a $\theta$-position encoder 15 and Z-position encoder 16 feed to the store 14 in real time digital signals defining the $\theta$ and Z-positions of the workpiece 10 and the tool 26 relatively to a datum. The $\theta$-position encoder 15 produces a signal every 2.5 degrees (or 0.5 degrees) of rotation of the workpiece and the Z-position encoder 16 produces a signal every 10 microns of axial movement of the tool 26.

On receipt of the Z-position and $\theta$-position signals, the computer 13 produces a group of bits corresponding to the required tool R-position at the (Z, $\theta$) position to produce the required workpiece profile. The computer 13 does in the following way. If the workpiece is rotating at 50 cycles per second and the $\theta$-position encoder 15 is producing a signal every 2.5 degrees, the computer 13 must produce a group of bits every 140 microseconds. Of course, at higher speeds and more complex profiles this time interval may be less than this, for example, it may be 14 microseconds. Since the store 14 cannot, in practice, store all the bits required to define the complete profile of the workpiece 10, a calculating unit 17 of the computer 13 calculates a few initial groups of bits from the input data held in the store 14 and passes these initial groups to the store 14, from which the initial groups are outputted to a signal processor 18, described in more detail below. During the remainder of the 140 microsecond interval between the groups, the calculating unit produces groups of bits for subsequent future tool positions. The number of groups so produced depends on the time available within each interval and the capacity of the store 14 to hold such groups.

It will be appreciated that the production of these groups from the input data will involve interpolation between the input data, because the groups may be required at intervals which are smaller than the intervals at which the input data is given. In this case, the interpolation is preferably a linear interpolation, although it will be appreciated that the computer 13 could be programmed to produce any other required interpolation. In addition, the computer 13 will be programmed to produce groups for the whole circumferential profile of the workpiece even where the input data defines only a portion of a symmetrical profile. For example, where the profile is elliptical and the input data defines only 90 degrees of the ellipse, the calculation unit 17 will calculate groups around the whole of the elliptical profile.

It will be appreciated that since not all future groups are calculated before the commencement of machining, the store 14 does not require a substantial capacity and the store 14 found in current microprocessors will in most cases be adequate.

The output from the computer 13 is thus a succession of groups of bits defining successive tool positions produced in real time at time intervals determined by the signals from the $\theta$-position encoder 15 and the Z-position encoder 16. This succession of groups of bits are received by a digital-to-analogue converter 18 which converts each of the succession of groups into a tool holder position signal of constant amplitude corresponding to the value of the associated group of bits and the duration of each tool holder position signal is the same as the interval between successive groups.

This output (which is effectively a series of consecutive steps) is fed to a step converter 20 of the signal processor 19. In the step converter 20, the amplitude of each signal is stored until the next succeeding signal is received by means such as a sample-hold device to store the output signal from the digital-to-analogue converter as an analogue voltage. As soon as the amplitude of the next succeeding signal has been established, the step converter 20 outputs a continuous signal which has an initial value equal to the value of the first received signal and has a final value equal to the value of the next successive signal. For this purpose, there is provided, for example, (1) an operational amplifier connected as a voltage subtractor, (2) a monostable multivibrator and operational amplifiers to produce an analogue voltage representative of the sample rate of the computer, and (3) an analogue multiplier producing the product of (1) and (2). Also included is an operational amplifier connected as a (4) ramp generator or integrator and connected to the output of (3), the analogue multiplier. An operational amplifier may also be included for producing the sum of the outputs of the sample-hold device and the (4) ramp generator. These are examples of conventional components for carrying out the functions of the step converter 201. Plainly if there is a difference in amplitude between the two successive signals, the continuous signal will rise or fall progressively between these initial and final values. This rise or fall may be linear but need not necessarily be so.

The output of the step converter 20 is thus a continuous signal which so changes progressively that at the end of successive time intervals equal to the time intervals of the digital signals, the amplitude of the signal is related to the successive values of the digital signals. This continuous signal can thus be regarded as an analogue of the succession of tool holder position signsls representing the required radial position of the tool 26 at a succession of ($\theta$, Z) positions on the workpiece 10.

This continuous signal is fed as an input signal to a feedback control device 21 (which may be embodied by a conventional servo control system) of a closed-loop continuous tool control system 22. As an example, such a system may include an operational amplifier connected as a subtractor with inputs from the step converter and tool position feedback transducer, as shown in the drawing, and producing an error signal fed to a servo amplifier, the function of which is to generate current in the actuator motor windings to produce torque to reduce the difference between the error signals and the velocity-dependent voltage from the tachogenerator on the motor shaft, to zero. Such devices may be implemented by off-the-shelf components described, for example, in "Operational Amplifiers - Design & Applications", Tobey, Graham, and Haelsemann, published by McGraw-Hill, 1972. The output of the feedback control device 21 is fed to a tool actuator 23 which moves the tool and tool holder in a radial direction in accordance with the output signal. The output of the tool actuator is monitored by a tool radial position transducer 24 and a tool radial speed transducer 25 which provide feedback tool position and tool velocity signals to the feedback control device 21 which uses these feedback signals to modify the continuous signal from the signal processor 19 in accordance with the feedback signals. The tool radial position transducer 24 and the tool radial speed transducer 25 may be embodied by a conventional non-contacting inductive transducer and a tachogenerator respectively, as are well known in the art.

Thus the computer 13 does not have to deal with the feedback control of the tool positioning signal. This is done in a purely analogue fashion in the closed-loop control system 22. This is another factor which allows the computer 13 to be a microprocessor while maintaining high rotational speeds and changes of tool position with a revolution.

The operation of the step converter 20 produces a time delay in the system. A further time delay is introduced by the inertia of the tool 26 and the associated tool holder. In general, this will not be a problem because, being constant, they will simply move the profile around the workpiece by a predetermined angle; possibly one or two of the successive $\theta$-positions; 2.5 or 5 degrees. It may, however, be that a workpiece profile is required which has a particular spatial orientation to some other workpiece feature. For example, where the workpiece 10 is a piston blank, the piston profile may be required to have a particular spatial orientation relative to a piston feature such as the gudgeon pin bore. In this case, the computer 13 may be programmed so that the datum positions from which the tool positions are calculated are offset by a distance equal to the time lag in the system. This will bring the profile into the required spatial orientation.

The tool actuator 23 and the tool holder 26 may take any convenient form provided that they have a bandwidth which allows reaction to the control signal at sufficient speed to move the tool to the required position within the required time interval. For this reason, it is not possible to use a conventional tool slide moved by a stepping motor through a lead screw. Nor is it possible to use a Swiss lathe mechanism in which a motor drives a cam bearing shaft through a lead screw with the cams rotating to move the tool holders into and out of position. In both of these cases, the inertia and time lag in the system is so great as to prevent successful operation. Because the signal switch is applied to these actuators is a continuous signal, there is no problem of requiring the tool to perform an infinite acceleration.

Examples of suitable tool actuators 23 include a high-torque low-inertia electric motor with a cam mounted directly on the output shaft and with a cam bearing directly on a pivotally mounted tool holder to move the tool holder against a spring force. Alternatively, the tool actuator may comprise a solenoid bearing on the tool holder or the tool 26 may be mounted directly on the armature of the solenoid. The tool may be mounted on an armature of a linear motor. A further possibility is for the tool 26 to be moved by ultrasonic or magnetostrictive or pneumatic means capable of reacting with sufficient speed i.e. having a sufficiently wide bandwidth.

It will be appreciated that the computer 13 can be quickly and simply programmed to produce any required workpiece profile. Indeed, by the provision of a keyboard shown in chain dotted line at 27, it is possible to alter the workpiece profile during machining. It will also be appreciated that the machining operation need not be to machine a cylindrical workpiece; it could machine a generally planar surface to have a non-flat profile. In addition, it need not be the exterior of the workpiece which is machined; it could be the interior of the workpiece.

The ability of the control system described above to move the tool rapidly within a revolution of high speed rotation, allows workpieces to be machined very accurately and rapidly having any requried surface profile.

It will also be appreciated that the workpiece need not rotate. It would be possible for the tool holder to rotate and for the workpiece to remain stationary. In this case, the $\theta$-position signals would be derived from a tool holder drive which would be separate from the drive which positions the tool radially.

It may be desirable to machine the workpiece 10 with two tools simultaneously. In this case, two control systems of the kind described above with reference to FIG. 1 may be provided, each actuating a respective tool in accordance with a required tool movement. For example, there may be simultaneous turning and boring of a workpiece facing and turning or boring of the workpiece.

Figure 2:
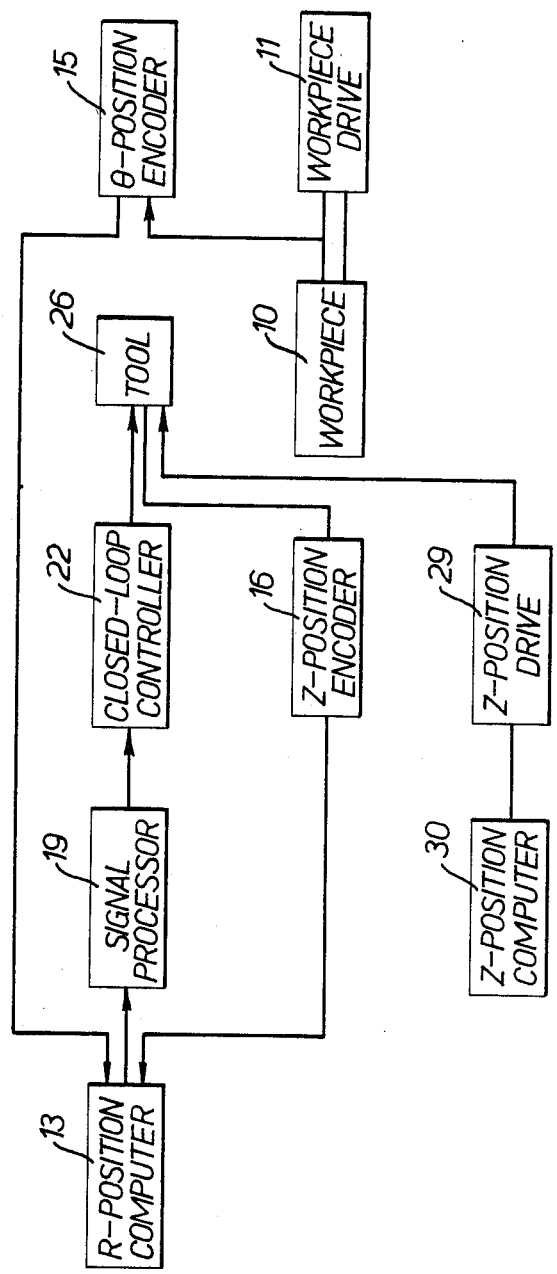
FIG. 2 is a schematic block diagram of a second control system for use in the high-speed machining of a workpiece to have a non-circular profile.

It will also be appreciated that for complex shapes, it may be desirable to process the Z-position and θ-position signals separately. A suitable arrangement for this is shown in FIG. 2. In this arrangement, two parallel systems are provided. The first system is substantially as described above with reference to FIG. 1 and comprises a computer 30, a signal processor 19 and a closed-loop control system 22 which control the radial position of the tool 26 (or the position to the tool in one direction). The computer 13 is fed with data defining the required radial position of the tool at various (θ, Z) positions. The second system comprises a Z-position computer 30 which receives data defined by the required rate of traverse of the tool 26 in the Z-direction. This data need only define this rate of traverse at various change points with the computer performing pre-programmed interpolation. The computer 30 outputs position signals which are fed to the Z-position actuator 29, which may be a stepping motor, to cause the tool 26 to be traversed at the required rate. Because the required rates of traverse or the rates of change of the rate of traverse in the Z-direction are comparatively low, it is possible to use a conventional stepping motor without feedback control or a hydraulic or pneumatic slide driven at constant velocity between flexed end stops.

The provision of a separate Z-position system allows the rate of traverse to be varied which may be necessary where the workpiece is composed of materials of differing hardness which require machining at different rates.

It will be appreciated that in any of the embodiments described above with reference to the drawings, the computer may also be used to control other machining functions. This may include control of the speed of rotation of the workpiece and/or the placing and removal of workpieces which may be by means of robotic arms.

I claim:

1. A machine tool for machining a surface of a workpiece about an axis to a predetermined profile which changes in two mutually perpendicular directions comprising:

a workpiece drive for holding the workpiece and for rotating said workpiece about an axis, angular position encoder means connected to said workpiece drive for producing a signal representing the angular position of the workpiece about said axis, a tool movable in one of said two mutually perpendicular directions towards and away from the workpiece and movable in the other of said two mutually perpendicular directions along the surface of the workpiece to machine the workpiece, first tool drive means connected to the tool for moving the tool in the other of said two mutually perpendicular directions along the surface of the workpiece, surface position encoder means connected to said first tool drive means for producing a signal representing the position of the tool along the surface of the workpiece in the other of said two mutually perpendicular directions, second tool drive means connected to the tool for moving the tool towards and away from the workpiece in the one of said two mutually perpendicular directions, a tool position transducer means for producing a feedback signal representing the position of said tool in the towards and away movement thereof, a tool velocity transducer means for producing a feedback signal representing the velocity of said tool in the towards and away movement thereof, a computer for producing from input data fed thereto a succession of digital signals defining required successive tool positions at defined angular and surface positions on said workpiece to machine the workpiece to the predetermined profile, a store included in the computer for storing said digital signals and connected to said angular position encoder means and said surface position encoder means and controlled by said computer to output a succession of digital signals corresponding to required tool positions at angular and surface positions represented by signals received from said respective encoder means, a signal processor for receiving the succession of digital signals outputted by said store and for converting said digital signals to a continuous analogue signal corresponding to required tool positions, and an analogue closed-loop control system having an input connected to said signal processor to receive said continuous analogue signal, and an input connected to said tool position transducer means and to said tool velocity transducer means to receive said tool position representing signals, said control system having an output connected to said second drive means and means for producing from said inputs an analogue output signal fed to said second drive means for controlling the tool movement to produce said predetermined profile on said workpiece, whereby said analogue closed loop control system provides closed loop control of the analogue output signal independently of the computer to allow the tool to perform rapid and complex tool movements at high workpiece rotations and speeds.

2. a control system according to claim 1 and wherein a workpiece is to be machined to a changing surface profile which is symmetrical about at least one plane including the axis of rotation of the workpiece and intersecting said surface, the computer receiving data defining the workpiece profile for only one of the symmetrical portions, the computer producing, from said data, tool holder position signals representative of required tool positions in both said symmetrical portion for which defined data is received and the at least one remaining symmetrical portion.

3. A control system according to claim 1, wherein said second tool drive means comprises a linear motor for receiving the continuous signal and for moving the tool holder in accordance therewith.

* * * * *